United States Patent [19]

Lindahl et al.

[11] Patent Number: 4,583,999
[45] Date of Patent: Apr. 22, 1986

[54] METHOD AND APPARATUS FOR FLUE-GAS CLEANING

[76] Inventors: Erik Lindahl, Appelboms väg 14, 186 00 Vallentuna; Gunnar Hovsenius, Tunavägen 32, 194 51 Upplands Väsby, both of Sweden

[21] Appl. No.: 641,001

[22] Filed: Aug. 15, 1984

[30] Foreign Application Priority Data

Aug. 31, 1983 [SE] Sweden .................................. 8304716

[51] Int. Cl.$^4$ ............................................. B01D 53/14
[52] U.S. Cl. ............................................. 55/68; 55/89; 55/228; 55/94; 55/73
[58] Field of Search ............... 55/30, 71, 89, 94, 223, 55/225, 228, 242, 68, 73, 23, 29, 84; 261/21, 118, 149

[56] References Cited

U.S. PATENT DOCUMENTS

| | | | |
|---|---|---|---|
| 2,598,116 | 5/1952 | Du Bois | 55/94 |
| 3,020,138 | 2/1962 | Wethly | 55/94 |
| 3,022,148 | 2/1962 | James | 55/94 |
| 3,073,092 | 1/1963 | Ancrum et al. | 55/89 |
| 3,343,341 | 9/1967 | Wiemer | 261/118 |
| 3,691,731 | 9/1972 | Garcia | 261/118 |
| 3,788,331 | 1/1974 | Neel et al. | 55/30 X |
| 3,950,150 | 4/1976 | Smorenburg | 55/223 X |
| 4,078,390 | 3/1978 | Duvall | 55/73 X |
| 4,239,511 | 12/1980 | Austermuhle | 55/84 |

*Primary Examiner*—Charles Hart

[57] ABSTRACT

A method of flue-gas cleaning comprising the separation of water-soluble substances from flue gases containing water vapor. The invention is characterized in that the flue gases are caused to be cooled by direct contact between flue gas and atomized water in two or more separation steps, where in a separation step (2) subsequent in the flow direction of the flue gases the flue gases are cooled by atomized water to a temperature, at which the water in the flue gases is condensed out, which water is collected and thereafter both recirculated for utilization in said subsequent separation step (2) and introduced into a separation step (1) prior in the flow direction of the flue gases. In said prior separation step the water is atomized and meets uncleaned flue gases, the water-soluble and potentially water-soluble substances of which thereby are solved in the atomized water. The water thus impurified is collected for further treatment.

7 Claims, 1 Drawing Figure

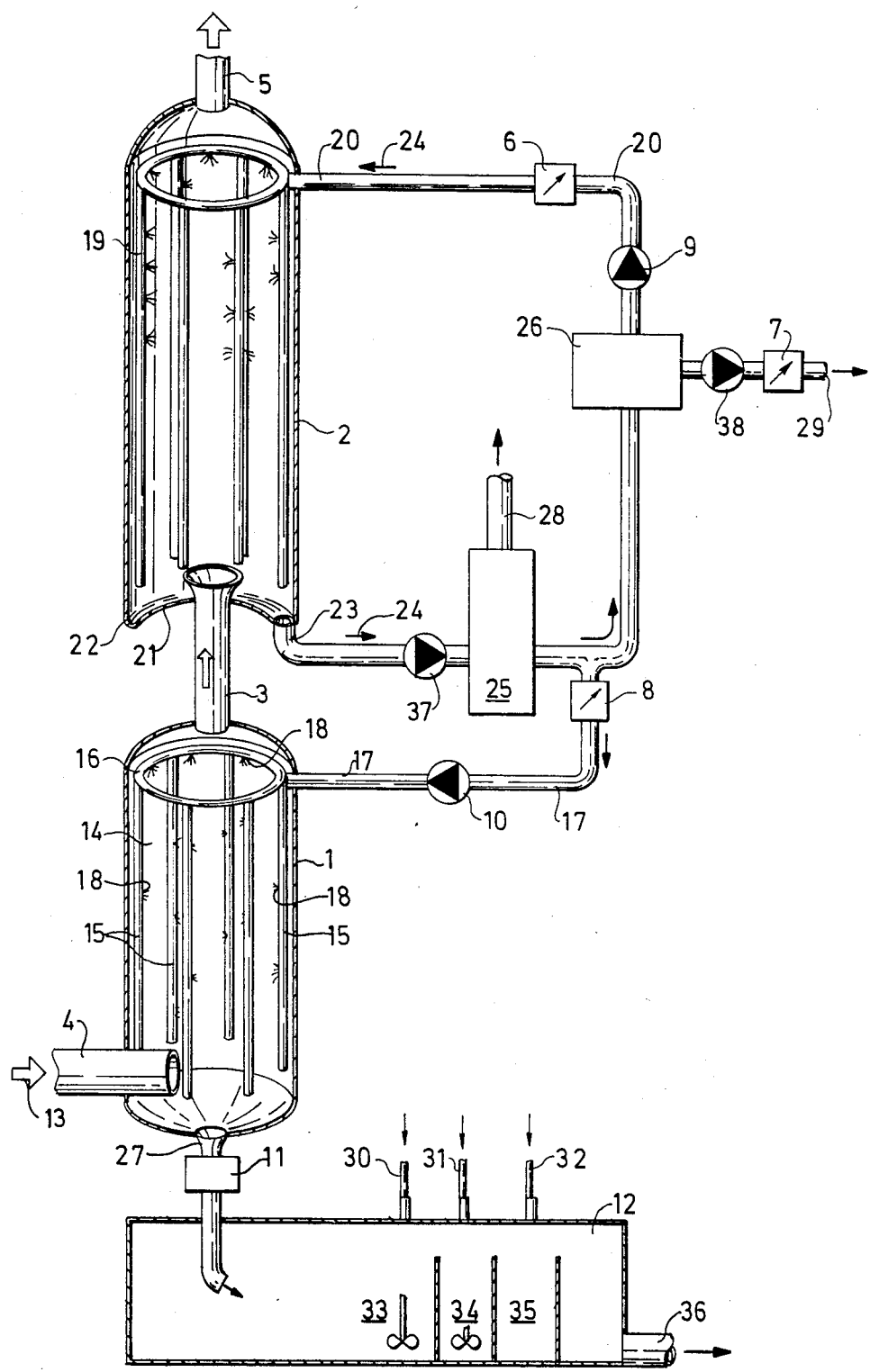

METHOD AND APPARATUS FOR FLUE-GAS CLEANING

This invention relates to a method and an apparatus for the cleaning of flue gases, especially of flue gases containing compounds soluble in acid aqueous solutions.

The present invention is intended particularly to be used for cleaning flue gases resulting from the combustion of household refuse, bulky waste, industrial waste or other fuel with a high water content, in respect of hydrocloric acid gas and heavy metals, such as mercury.

Flue gases often are cleaned by using various types of mechanical filters and precipitators. More scarcely, such methods are combined with wet ones, at which the washing medium is supplied externally to the system as a separate material flow.

According to the present invention, however, the water inherent in the flue gas is utilized for cleaning the flue gases, thereby achieving the separation of water-soluble compounds. These compounds are concentrated in a later step by precipitation and thereafter are removed from the system.

The present invention, thus, relates to a method of flue-gas cleaning, comprising the separation of water-soluble substances from flue gases containing water vapour. The invention is characterized in that the flue gases are caused to cool by direct contact between flue gas and atomized water in two or more separation steps, and in a subsequent separation step in the flow direction of the flue gases the flue gases are cooled by atomized water to a temperature, at which the water in the flue gases is condensed out, which water is collected and thereafter both recycled for utilization in said subsequent separation step and introduced into a prior separation step in the flow direction of the flue gases, in which prior separation step the water is caused to be atomized and to meet uncleaned flue gases, the water-soluble and potentially water-soluble substances of which thereby are solved in the atomized water, and that the water thus impurified is collected for further treatment.

The invention further relates to an apparatus for the cleaning of flue gases acording to said method, which apparatus is of the type and has the main characterizing features as defined in the attached claim 5.

The invention is described in greater detail in the following, with reference to an embodiment shown in the accompanying drawing of an apparatus according to the invention, the drawing FIGURE showing an apparatus, of which a first and a second separation step are illustrated partially cut open.

In the FIGURE, a first separation step 1 and a second separation step 2 are shown, which are interconnected by a pipe 3. An inlet pipe 4 for flue gases is located in the lower portion of the first separation step, and an outlet pipe 5 for cleaned flue gases is located at the upper portion of the second separation step 2.

The numerals 6,7,8 designate control valves, the numerals 9 and 10 designate pumps, 11 is a water and/or vapour seal, and 12 is a separation tank. The arrows in the FIGURE indicate flow directions.

Flue gases 13 from a combustion plant are intended to be fed into the apparatus via the inlet pipe 4. Prior to their feed-in, the flue gases preferably are cooled in a cooler (not shown) to a temperature of 200°-250° C.

The flue gases thus fed-in rise through the first separation step 1.

The first separation step 1 comprises a cylindric vessel, in which a tube system 14 is located. The tube system 14 comprises a plurality of substantially vertically arranged tubes 15, which are connected directly or indirectly to one or more feed pipes 16,17. Each tube 15, 16 is provided with a great number of apertures acting as spray nozzles for water. For reason of clearness, only a small number of apertures have been marked in the FIGURE by outflowing water 18.

In operation, water is pumped by a pump 10 in the feed pipe 17 to the tube system 14 whereby atomized water flows out through said apertures. The upward flowing flue gas is hereby mixed effectively with water droplets.

The second separation step 2 also comprises a cylindric vessel, in which a tube system 19 is located, which corresponds to the one described with reference to the first separation step.

The tube system 19 has the same object and function. In operation it is supplied with water from a feed pipe 20 by means of a pump 9.

The second separation step is formed at its lower end with an upward convex portion 21. The said pipe 3 connects the upper portion of the first separation step to the lower portion of the second separation step 2. The pipe 3 is connected to the highest point of the convex portion 21, and an annular cup 22 is formed in the lower portion of the second separation step. An outlet pipe 23 is connected at the bottom of said cup 22.

A flow circuit for the second separation step 2 comprises—marked by the arrows 24 in the flow direction—the outlet pipe 23, a pump 37, a cooler 25 such as a heat pump, a possible device 26 for adjusting the pH-value of the water and the content of suspended substances, said pump 9, a control valve 6 and, finally, said feed pipe 20, which is connected to the tube system 19.

The said feed pipe 17 to the tube system 14 of the first separation step 1 is connected to said flow circuit via a control valve 8.

In the lower portion of the first separation step 1, a discharge pipe 27 is located which opens into a tank 12 and is provided with a water and/or vapour seal.

The tank 12 is provided with one or several sections or may consist of separate units connected in series for the neutralization and/or precipitation of different substances in the water coming from the lower separation step. For this purpose, the tank 12 is provided with one or more nozzles 30,31,32 or the like for adding chemicals for the precipitation of desired substances and with means for stirring and mixing as well as for separating resulting precipitates.

As mentioned above in the introductory portion, the object of the invention is to neutralize and/or separate water-soluble or potentially water-soluble substances from gases and flue gases with a high water vapour content.

The separation of the substances is effected by cooling the gas or flue gas by direct contact between gas and atomized water in two or more separation steps connected in series. The necessary water amount is obtained by lowering the gas temperature to a desired level below its dew point.

The second separation step 2 has the object primarily by cooling the gas to condense-out the water amount, which is desired in the first separation step 1. It is thereby possible to use simple structural material in the second separation step.

The condensing-out of water from the gases proceeds in such a manner, that the gases are cooled by water flowing out of the tube system 19 to a temperature below the dew point at the pressure in question. For the gases flowing into the second separation step 2 an inlet temperature of e.g. 60°–70° C. and an outlet temperature of the gases of about 35° C. are chosen.

The separated water is circulated in said flow circuit. The water is cooled in the cooler 25, which preferably comprises a heat pump. Heated medium can pass out through a pipe 28.

As mentioned above, a device 26 not described in detail can be provided for adjusting the properties, for example the pH-value, of the water. When the water or separated suspended substances must be drained off from the flow circuit, the aforesaid value 7 is used together with an associated pump 38 and a discharge pipe 29.

The main part or all of the water which has been condensed out in the second separation step, however, is passed via the valve 8 from the flow circuit to said feed pipe 17 and via the pump 10 to the tube system 14 of the first separation step 1. The valve 8 is located after the cooler 25, and therefore cooled water is caused to be atomized and sprayed via the system in the first separation step 1.

In the first separation step 1 incoming flue gases, which have a temperature of e.g. 215°–230° C., are cooled to the aforesaid temperature of 60°–70° C., whereby the water in the gas to some part can be condensed out, and water-soluble substances are washed out of the gas. The part of the water which is not evaporated thereby, is removed from the system through the discharge pipe 27 to the tank 12.

The apparatus and the method are especially suitably used for separating hydrochloric acid gas from flue gases and for substances forming complex difficultly volatile substances with chlorine.

Thus, hydrochloric acid, HCl gas and water-soluble mercury compounds and other water-soluble substances are solved and separated. Especially valuable is the separation of mercury out of flue gases from the combustion of e.g. household refuse.

Due to the presence of HCl in the flue gases, complex ions between mercury and chlorine are formed, which are not volatile but remain in aqueous phase.

The cleaning in the first separation phase 1, of course, is not 100 percent, but the second separation step 2 acts as final cleaning step as well as cooler.

The contact between gas and liquid, thus, is intended to take place in a combination of counter-current and cross-current apparatuses, where liquid is sprayed-in on different levels in the separation steps, whereby both a low pressure drop for the gas and a repeated drip formation with high washing-out effect are obtained.

As has appeared from the aforesaid, no washing water has to be added in addition to the water required for initially starting the process.

The process, thus, is carried out with a relatively small amount of water. This is of advantage for the further treatment of the water enriched with impurities.

The water injected in the first separation step 1, as mentioned, flows out through the discharge pipe 27 in the tank 12.

As the washing-out proper takes place in a system with no re-circulation of liquid, a high and specific separation of the substance in question is obtained. These substances can be neutralized in the tank and, respectively, be separated from the water by combinations of reaction and filtering steps.

The water collected in the tank system 12 is treated with chemicals, which are specific for the impurities desired to be separated from the water or be further treated.

Lime (CaO) e.g. is added for neutralizing hydrochloric acid (HCl). Preferably also mercury is to be separated, for which purpose the water-soluble sulphide $Na_2S$ is added.

CaO and $Na_2S$ are added in a suitable way, for example through the nozzles 30,31,32.

The present invention is not restricted to the separation of hydrochloric acid and mercury, which are of interest when household refuses are combusted, but every compound desired can be separated in the tank system 12 by adding known chemicals reacting with the substance to be separated. Precipitates resulting therefrom can be collected in different separate sections 33,34,35 in the tank system 12. Purified water can thereby be discharged through a discharge pipe 36.

Resulting residue products, such as precipitates, can thereafter be stored finally or be utilized for other purposes.

The method and the apparatus, thus, render it possible to extremely effectively separate impurites in flue gases by using only the water contained in the flue gases. This implies, that the water collected has a high content of impurities, which facilitates their further treatment.

The method and the apparatus, furthermore, are extremely simple to carry out and, respectively, to manufacture, so that the flue-gas cleaning costs can be kept very low compared to conventional art.

The apparatus, of course, must be dimensioned according to the demand in respect of flue-gas volume and temperature, impurities to be separated, etc.

As an example can be mentioned, however, that when the vessel of the separation steps has a diameter of about 2 m and a height of 6 m, the vertical tubes have a total of about 100 apertures with a diameter of 2,5 mm.

At such a design and a flue-gas volume of 9 $m^3/s$, 0,6 liter water/s are generated, which is sufficient for substantially separating HCl and Hg from flue gases from normal household refuse.

The invention, of course, can be varied. Two or more series of separation steps can be connected in parallel, a certain amount of water be added externally, purification of separated water be introduced also in later separation steps, the vessel be positioned horizontally, etc. Such modifications are considered to be comprised in the invention in its widest scope.

The present invention, thus, must not be regarded restricted to the embodiments stated above, but can be varied within the scope defined in the attached claims.

We claim:

1. A method of flue-gas cleaning, comprising the separation of water-soluble substances from flue gases containing water vapour, where the flue gases are caused to directly contact atomized water in two or more separation steps, characterized in that the water necessary for the method during operation is extracted from the flue gases in a subsequent separation step in the flow direction of the flue gases, in which step the flue gases are cooled by atomized water to a temperature, at which the water in the flue gases in condensed out, which water is collected and thereafter both recirculated for being utilized in said subsequent separation step and introduced into a prior separation step in the flow direction of the flue gases, in which prior separation step the water is caused to be atomized and to meet uncleaned flue gases, the water soluble and potentially water soluble substances of which thereby are solved in the atomized water, and that the water thus impurified is discharged from said prior step and is collected to be further treated and wherein the water which is collected in said subsequent separation step and is recirculated, is cooled by a cooler, located, in the flow direction, after the vessel of the subsequent separation step but before introduction into said prior separation step.

2. A method as defined in claim 1, characterized in that in each of the separation steps water is introduced by a pump in a tube system comprising a great number of apertures or nozzles for atomizing the water, and that atomized water is caused to flow out to the greater part of the volume of a vessel enclosing the separation step.

3. A method as defined in claim 1, characterized in that at said further treatment of collected impurified water chemicals are added, which together with the impurity in question from a water-soluble compound, which is separated from the water.

4. An apparatus for flue-gas cleaning comprising the separation of water-soluble substances from flue gases containing water vapour, where two or more separation steps (1,2) are comprised, each of which is provided with means (14,19) for injecting atomized water into a vessel and with inlet and outlet pipes (4,3,5) for passing flue gases through the vessel, characterized in that a separation step (2) subsequent to a preceding separation step in the flow direction of the flue gases is provided with a flow circuit (23,25,20,6,9), including connection pipes and a cooler, which is capable both to recirculate water separated from the flue gases in said subsequent separation step (2) to continuously cool the flue gases to a temperature where the water vapour is separated from the flue gases thereby obtaining the water necessary for the method during operation, and via a connection pipe (17) downstream of said cooler to provide a separation step (1) prior in the flow direction of the flue gases with water thus separated, in order thereby in the prior separation step (1) to separate water-soluble and potentially water-soluble substances in the flue gases by solving the same in the water, and that said prior separation step (1) is connected to a collecting vessel (12) or the like for water thus impurified.

5. An apparatus as defined in claim 4, characterized in that each of the separation steps (1,2) comprises a vessel provided with said means (14,19), and said means comprise a tube system (14,19) consisting of a plurality of tubes (15,16) with a great number of apertures or nozzles, so that at the pumping of water into the tube system (14,19) atomized water meets flowing flue gases, and that the tube system (14,19) is arranged so that atomized water can be caused to flow out to the greater part of the volume of said vessel.

6. An apparatus as defined in claim 4, characterized in that the subsequent separation step (2) is cylindric and formed with an upward convex bottom (21), in the highest point of which an inlet pipe (3) for flue gases is located, and that an annular cup (23) thus formed about the bottom for collecting separated water is connected via a connecting pipe (23) to the remaining part of the flow circuit (25,20,6,9).

7. An apparatus as defined in claim 5, characterized in that said vessels are arranged for vertical upward directed transport of flue gases, and that said tubes (15) with apertures or nozzles are arranged vertically in the vessel.

* * * * *

UNITED STATES PATENT AND TRADEMARK OFFICE
CERTIFICATE OF CORRECTION

PATENT NO. : 4,583,999
DATED : April 22, 1986
INVENTOR(S) : Erik Lindahl and Gunnar Hovsenius It is certified that error appears in the above-identified patent and that said Letters Patent is hereby corrected as shown below:

Column 1, line 46, change "acording" to --according---.

Column 3, line 18, change "value" to --valve--.

Column 4, line 68, "in" second occurrence, should read -- is --.

Signed and Sealed this

Second Day of September 1986

[SEAL]

Attest:

DONALD J. QUIGG

Attesting Officer

Commissioner of Patents and Trademarks